United States Patent [19]

Ikeda et al.

[11] Patent Number: 4,698,367

[45] Date of Patent: Oct. 6, 1987

[54] EXPANDABLE THERMOPLASTIC RESIN PARTICLES

[75] Inventors: Toshiki Ikeda, Otsu; Yoshitugu Beppu, Shiga; Takashi Yamamoto, Yokohama; Hideyo Ishigaki; Hiroshi Ohmura, both of Aichi, all of Japan

[73] Assignees: Sekisui Kaseihin Kogyo Kabushiki Kaisha, Nara; Nippon Oil and Fats Co., Ltd., Tokyo, both of Japan

[21] Appl. No.: 947,738

[22] Filed: Dec. 30, 1986

[30] Foreign Application Priority Data

Dec. 30, 1985 [JP] Japan ................................. 60-297500

[51] Int. Cl.$^4$ ............................................... C08J 9/22
[52] U.S. Cl. ...................................... 521/57; 428/407; 521/134; 521/139; 523/201; 525/902
[58] Field of Search .......................... 521/57; 428/407; 523/201; 525/902

[56] References Cited

U.S. PATENT DOCUMENTS

| | | | |
|---|---|---|---|
| 3,574,791 | 4/1971 | Sherman et al. | 260/884 |
| 3,728,151 | 4/1973 | Sherman et al. | 117/138.8 |
| 3,819,546 | 6/1974 | Alteres, Jr. | 521/57 |
| 3,944,527 | 3/1976 | McCown et al. | 260/79.7 |
| 3,995,085 | 11/1976 | McCown et al. | 428/262 |
| 4,153,763 | 5/1979 | Bracke | 521/57 |
| 4,307,134 | 12/1981 | Milkovich et al. | 521/57 |
| 4,385,156 | 5/1983 | Ingram | 521/57 |
| 4,433,029 | 2/1984 | Senda et al. | 521/57 |
| 4,622,346 | 11/1986 | DiGirlio | 521/57 |

FOREIGN PATENT DOCUMENTS 59-41339  3/1984  Japan .

*Primary Examiner*—Morton Foelak
*Attorney, Agent, or Firm*—Armstrong, Nikaido, Marmelstein & Kubovcik

[57] ABSTRACT

Expandable thermoplastic resin particles comprising a thermoplastic resin and a hydrocarbon having the lower boiling point than the softening point of the thermoplastic resin in which a copolymer composed of a fluorinated vinyl polymer part and a hydrophilic vinyl polymer part covers or is included on the surface or in the surface layer of the expandable thermoplastic particle, said resin particles are useful for producing package vessels and containers for oily or fatty foods.

10 Claims, No Drawings

EXPANDABLE THERMOPLASTIC RESIN PARTICLES

BACKGROUND OF THE INVENTION

1. Field of the Invention

This invention relates to expandable thermoplastic resin particles. More particularly, it relates to expandable thermoplastic resin particles which can produce molded vessels having the advantages which prevent oil or fat in oily or fat containing foods such as instant noodle or fried chicken or regular coffee in the vessels from exuding outwards through the fusing surface between foamed particles on vessel wall, prevent water from exuding out of drain pan (saucer) used for home air-conditioners, and/or prevent ice-water from exuding out of portable simplified iceboxes.

2. Description of the Prior Art

Expandable thermoplastic resin particles are prepared by impregnating, for example, polystyrene resin particles with a small amount of a volatile fatty hydrocarbon, e.g. n-pentane, which only slightly swells the particles in an aqueous suspension, or by impregnating the particles with a blowing agent such as butane or propane in usual gas form in an aqueous suspension containing a small amount of a slovent such as toluene or cyclohexane having solubility to polystyrene resin particles. Thus obtained expandable thermoplastic resin particles are used as materials for preparing thermoplastic foamed molded articles. To obtain thermoplastic foamed molded articles economically and industrially, expandable thermoplastic resin particles are firstly pre-expanded and the resulting pre-expanded particles are charged into a perforated mold cavity of a molding machine, where the particles are heated over their softening point by injecting pressured steam into the perforation of the perforated mold cavity to unite each pre-expanded particle by fusing together, whereby a molded article as the cavity being obtained.

In case expandable thermoplastic resin particles used for such object contain a substance of good affinity to the thermoplastic resin such as n-pentane, they have a tendency of coagulating the particles during the pre-expanding process because of lowering of the thermal stability. The coagulated particles block a particles conveying pipe or a mold cavity charging hole, disturbing a molding process. Accordingly, expandable thermoplastic resin particles of no coagulation in pre-expanding are required. Thus, to cover the surfaces of expandable thermoplastic resin particles with, for example, metal soap, talc powder, or wax in advance has been well known. But, these surface covering agents, on the other hand, have a tendency to retard fusing together of the resin particles in molding. It is also a known method to add materials which prevent coagulation prior to molding and do not retard fusing together in molding. Thus obtained known foamed molded articles, however, have a fusing together surface of imperfect uniting with opening of fine capillaries in cutting it, even if the fusing together state of each expandable polymer particle is satisfactory, that is, no surface of each particle appears on the cut surface to 100% of the degree of fusing together. It can be confirmed, for example, by noticing that an aqueous solution of a dyestuff containing a surfactant put into the molded article exuded out through the article. More concretely, when a molded article obtained by the known molding process using conventional expandable styrene polymer particles, e.g. a cup, was allowed to stand after putting a coffee solution containing 0.01 w/w % of sodium alkylbenzenesulfonate, after about 10 min the coffee solution notably exuded out of the cup side-wall through the clearance between foamed particles, even if the cup was a normal molded fusing together state. Although these cups had no difficulty in practical use as drinking cups for normal coffee or Coke, they were unsuitable for vessels for oily foods, for example, foods containing salad oil, tallow, or lard such as doughnut, hamburger, fried chicken, or margarin, because in such foods stored for long periods oil or fat exuded gradually out of vessel wall. Further, when instant noodle mixed with curry was stored after put into these vessels, the yellow color in curry exuded out of vessel wall with staining the vessels, markedly reducing the commercial value as instant noodle with vessel. Further, since a drain pan of foamed molded thermoplastic for a home small type air-conditioner has drain water exudation, usually a pan applied coating forming paraffin or resin film on the molded surface is used. Also, in a simplified ice-box portable for trip of foamed molded thermoplastic ice-water exudes in long hours, lowering the commercial value.

On the other hand, there has been a proposal of covering expandable thermoplastic resin particles with phosphoric acid ester containing perfluoroalkyl group (Japanese Patent Laid-Open Sho No. 59-41339). However, the resin particles had a difficulty to fusing together when molded, whereby a problem of lowering productivity was resulted, requiring prolongation of the heating time for molding.

Further, by the formation of fused film on the surface of foamed molded articles by the use of a particular mold or under the heating condition at an elevated temperature in molding expandable styrene polymer, oil or fat exudation can be prevented. However, in conventional expandable polystyrene particles, the above method causes the foamed article to shrink with fusing because of the low thermal stability, being difficult to obtain a beautiful molded article having an appearance of good commercial value. In addition, the marked prolongation of molding cycle time at an elevated temperature reduces the productivity. The cups obtained by such method are lower in bending strength than those obtained by a conventional method, being nearly unusable practically because of the brittle property.

SUMMARY OF THE INVENTION

It is an object of the present invention to eliminate the above problem up to now. Particularly, the invention is aimed to provide new expandable thermoplastic resin particles which can produce package vessels and containers for oily or fatty foods. According to the invention, it provides expandable thermoplastic resin particles comprising a thermoplastic resin and a hydrocarbon having the lower boiling point than the softening point of the thermoplastic resin, in which a copolymer composed of a fluorinated vinyl polymer part and a hydrophilic vinyl polymer part covers or is included on the surface or in the surface layer of the expandable thermoplastic particle.

The expandable thermoplastic resin particles of the invention does not cause coagulation before molding and can produce a foamed molded article which has an excellent fusing together property and markedly prevents oil or water exudation. Further, since the resin particles of the invention can produce desired molded articles in a shorter molding time than in conventional resin particles of the similar object, the improvement of productivity of 10–15% at least can be expected.

DESCRIPTION OF THE PREFERRED EMBODIMENT

Examples of the thermoplastic resin constituting the thermoplastic resin particles include a homopolymer of styrene or methylstyrene, copolymer of styrene with acrylonitrile, acrylic acid ester or methacrylic acid ester (such as styrene-acrylonitrile, styrene-methylmethacrylate or methylacrylate), an ethylene homopolymer, an ethylene copolymer such as ethylene-vinylacetate, a propylene homopolymer, copolymer of propylene with ethylene, copolymer of polyethylene with styrene, and a mixed resin thereof. The preferable example is styrene resins.

As the blowing agents, there may be mentioned volatile hydrocarbons having boiling points lower than the softening points of the above resin, such as propane, n-butane, isobutane, n-pentane, neopentane or dichlorofluoromethane. The expandable thermoplastic resin particles may be obtained by impregnating the above mentioned resin particles with an aqueous suspension of a blowing agent in autoclave. The blowing agent may be usually impregnated in an amount of 1–10 w/w % to the particles.

The fluorinated vinyl polymer part constituting the copolymer of the present invention is preferred to be those comprising one or more types of fluorinated vinyl monomers selected from the following groups:

(a) a compound of the formula:

$$\begin{array}{c} R_1 \; O \\ | \; \parallel \\ CH_2=C-COR_2R_3 \end{array}$$

[wherein $R_1$ is —H, —F, —CH$_3$, —CHF$_2$, —CH$_2$F, —CF$_3$, —OCOCH2F, —OCOCHF$_2$, or —C$_n$F$_{2n+1}$ (n is an integer of 1–10), $R_2$ is —C$_m$H$_{2m}$ (m is an integer of 1–12), or —CH$_2$CH$_2$O—, $R_3$ is —C$_q$F$_{2q+1}$ (q is an integer of 1–16), —(CF$_2$)$_n$ OR$_5$ (R$_5$ is —C$_a$H$_{2a}$C$_b$F$_{2b+1}$ or —C$_a$H$_{2a}$C$_b$F$_{2b}$H, (a is an integer of 0–10, b is an integer of 0–16, and n is the same as above), —(CF$_2$)$_q$H (q is the same as above),

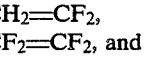

($R_4$ is —C$_q$F$_{2q+1}$, $R_6$ is —C$_n$H$_{2n+1}$, (q and n are the same as above).], (b) a compound of the formula:

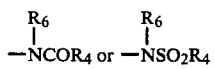

[wherein $R_7$ is —H or —F, $R_8$ is —C$_a$H$_{2a}$C$_b$F$_{2b+1}$ (a and b are the same as above), or —CF$_2$ CHFCl], (c) a compound of the formula:

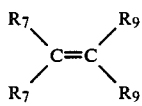

[wherein $R_7$ is the same as above, $R_9$ is —H, —F, or —Cl; at least one of $R_7$ and $R_9$ —F], (d) a compound of the formula:

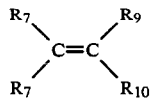

[wherein $R_7$ and $R_9$ are the same as above, $R_{10}$ is —C$_a$H$_{2a}$F$_{2b+1}$ (a and b are the same as above)]

Specific examples of the compound of the formula (a) are
CH$_2$=CHCOOC$_2$H$_4$C$_8$F$_{17}$,
CH$_2$=C(CH$_3$)COOC$_2$H$_4$C$_8$F$_{17}$,
CH$_2$=CHCOOC$_2$H$_4$C$_6$F$_{12}$OC$_2$H$_4$C$_6$F$_{13}$,
CH$_2$=C(CH$_3$)COOC$_2$H$_4$C$_{10}$F$_{20}$OC$_2$H$_4$C$_{10}$F$_{20}$H,
CH$_2$=CHCOOC$_2$H$_4$C$_{10}$F$_{20}$H,
CH$_2$=CHCOOCH$_2$N(C$_2$H$_5$)COC$_6$F$_{13}$,
CH$_2$=CHCOOC$_2$H$_4$N(C$_2$H$_5$)COC$_{12}$F$_{25}$,
CH$_2$=C(CH$_3$)COOCH$_2$N(C$_2$H$_5$)COC$_8$F$_{17}$,
CH$_2$=CHCOOC$_2$H$_4$N(CH$_3$)SO$_2$C$_6$F$_{13}$,
CH$_2$=C(CH$_3$)COOC$_2$H$_4$N(CH$_3$)SO$_2$C$_{12}$F$_{25}$,
CH$_2$=(CHF$_2$)COOC$_2$H$_4$C$_8$F$_{17}$, and
CH$_2$=C(CH$_3$)COOC$_2$H$_4$C$_{10}$F$_{21}$.

Specific examples of the compound of the formula (b) are
CH$_2$=CHOCH$_2$C$_6$F$_{13}$,
CH$_2$=CHOCH$_2$C$_{10}$F$_{21}$, and
CF$_2$=CFOCH$_2$C$_8$F$_{17}$.

Specific examples of the compound of the formula (c) are
CH$_2$=CF$_2$,
CF$_2$=CF$_2$, and

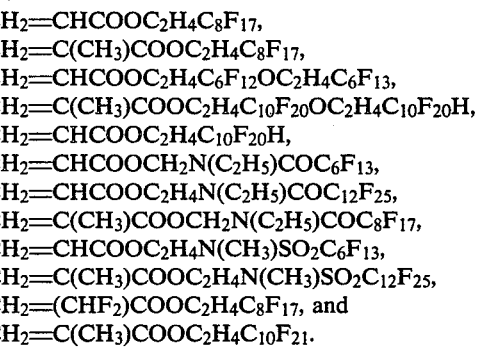

Specific examples of the compound of the formula (d) are
CH$_2$=CH—C$_6$F$_{13}$,
CH$_2$=CH—C$_{10}$F$_{21}$, and
CF$_2$=CF—C$_8$F$_{17}$.

The hydrophilic vinyl polymer part constituting the copolymer of the present invention is preferred to be those comprising one or more types of hydrophilic vinyl monomers selected from the following groups:

(e) a compound of the formula:

$$\begin{array}{c} R_{11} \; O \\ | \; \parallel \\ CH_2=C-CO \; (C_rH_{2r}O)_pH \end{array}$$

(wherein $R_{11}$ is —H or —CH$_3$, r is an integer of 1–4, and p is an integer of 1–20), (f) a compound of the formula:

$$\begin{array}{c} R_{11} \; O \quad R_{12} \\ | \quad \| \quad / \\ CH_2=C-CN \\ \quad \backslash \\ \quad R_{12} \end{array}$$

[wherein $R_{11}$ is the same as above, $R_{12}$ is —H, —$C_rH_{2r+1}$ (r is the same as above), —$CH_2OCH_3$, —$C(CH_3)_2CH_2COCH_3$, $$-C_2H_4N\begin{array}{l}(C_2H_4O)_nH \\ \backslash \\ (C_2H_4O)_nH\end{array}$$

(n is the same as above), —$C_rH_{2r}CONH_2$ (r is the same as above), —$C_2H_4CONH_2$, —$C_2H_4N(CH_3)_2$, —$(CH_2)_3N(CH_3)_2$, —$COOC_rH_{2r+1}$ (r is the same as above), or —$C_xH_{2x}SO_3H$ (x is an integer of 2-4)], (g) a compound of the formula:

$$\begin{array}{c} R_{11} \; O \quad\quad R_{13} \\ | \quad \| \quad\quad / \\ CH_2=C-COC_yH_{2y}N \\ \quad\quad\quad \backslash \\ \quad\quad\quad R_{13} \end{array}$$

[wherein $R_{11}$ is the same as above, y is 2 or 3, $R_{13}$ is —$C_zH_{2z+1}$ (z is an integer of 1-8)], (h) a compound of the formula:

$$\begin{array}{c} R_{11} \; O \\ | \quad \| \\ CH_2=C-COCH_2-CH(CH_2)_wN^+(CH_3)_3X^- \\ \quad\quad\quad\quad | \\ \quad\quad\quad\quad R_{14} \end{array}$$

(wherein $R_{11}$ is the same as above, $R_{14}$ is —H or —OH, w is 0 or 1, X is —Cl, —Br, —I, or —COO), (i) a compound of the formula of the formula:

$$\begin{array}{c} R_{11} \; O \quad\quad O \\ | \quad \| \quad\quad \| \\ CH_2=C-COR_{15}O-P-OH \\ \quad\quad\quad\quad | \\ \quad\quad\quad\quad OH \end{array}$$

[wherein $R_{11}$ is the same as above, $R_{15}$ is —$C_yH_{2y}$ (y is the same as above) or $$\begin{array}{c} -CH_2-CH- \\ | \\ CH_2Cl \end{array}],$$

(j) a compound of the formula:

$$\begin{array}{c} O \\ \| \\ R_{16}CH=R_{17}C-COH \end{array}$$

(wherein $R_{16}$ is —H, —$CH_3$, or —COOH, $R_{17}$ is —H, —$CH_3$, or —$CH_2COOH$), (k) N-vinylpyrrolidone.

Specific examples of the compound of the formula (e) are $$\begin{array}{c} O \\ \| \\ CH_2=CH-COC_2H_4OH, \end{array}$$

-continued $$\begin{array}{c} O \\ \| \\ CH_2=CH-COC_3H_6OH, \end{array}$$

$$\begin{array}{c} O \\ \| \\ CH_2=C(CH_3)COC_2H_4OH, \text{ and} \end{array}$$

$$\begin{array}{c} O \\ \| \\ CH_2=C(CH_3)CO(C_2H_4O)_4H. \end{array}$$

Specific examples of the compound of the formula (f) are $$\begin{array}{c} O \quad CH_3 \\ \| \quad / \\ CH_2=CH-CN \\ \quad \backslash \\ \quad CH_3 \end{array},$$

$$\begin{array}{c} O \quad CH_2OH \\ \| \quad / \\ CH_2=CH-CN \\ \quad \backslash \\ \quad H \end{array},$$

$$\begin{array}{c} O \quad CH_2OCH_3 \\ \| \quad / \\ CH_2=CH-CN \\ \quad \backslash \\ \quad H \end{array},$$

$$\begin{array}{c} \quad\quad\quad (C_2H_4O)_\alpha H \\ O \quad C_2H_4N \\ \| \quad / \quad\quad \backslash \\ CH_2=CH-CN \quad\quad (C_2H_4O)_\beta H \quad (\alpha+\beta=10), \\ \quad \backslash \\ \quad H \end{array}$$

$$\begin{array}{c} O \quad CH_2CONH_2 \\ \| \quad / \\ CH_2=CH-CN \\ \quad \backslash \\ \quad H \end{array},$$

$$\begin{array}{c} O \quad\quad CH_3 \\ \| \quad\quad | \\ CH_2=C(CH_3)-CNH-C-CH_2-SO_3H, \text{ and} \\ \quad\quad\quad\quad | \\ \quad\quad\quad\quad CH_3 \end{array}$$

$$\begin{array}{c} O \\ \| \\ CH_2=C(CH_3)-CNHCOOCH_3. \end{array}$$

Specific examples of the compound of the formula (g) are $$\begin{array}{cc} O \quad CH_3 & O \quad C_2H_5 \\ \| \quad / & \| \quad / \\ CH_2=CHCOC_2H_4N & \text{and } CH_2=C(CH_3)COC_3H_6N \\ \quad \backslash & \quad \backslash \\ \quad CH_3 & \quad C_2H_5 \end{array}.$$

Specific examples of the compound of the formula (h) are $$\begin{array}{c} O \\ \| \\ CH_2=CH-COCH_2-CH-CH_2N^+(CH_3)_3Cl^-, \text{ and} \\ \quad\quad\quad\quad | \\ \quad\quad\quad\quad OH \end{array}$$

$$\begin{array}{c} O \quad\quad\quad CH_3 \\ \| \quad\quad\quad / \\ CH_2=C(CH_3)-COCH_2CH_2N^+-CH_3COO^-. \\ \quad\quad\quad\quad \backslash \\ \quad\quad\quad\quad CH_3 \end{array}$$

Specific examples of the compound of the formula (i) are

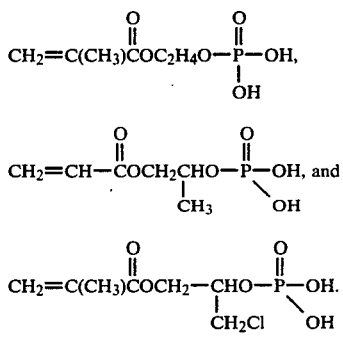

Specific examples of the compound of the formula (j) are

In the copolymer to be used in the invention, the fluorinated vinyl polymer part and the hydrophilic vinyl polymer part are preferable to be 20–80 w/w % respectively. In case the fluorinated vinyl polymer part is less than 20 w/w %, that is the hydrophilic vinyl polymer part is more than 80 w/w %, it is difficult to exhibit an effect enough to prevent the exudation of oil or water, because the arrangement of fluoroalkyl groups on the surface of the resin particle is insufficinet. On the other hand, in case the fluorinated vinyl polymer part exceeds 80 w/w %, that is the hydrophilic vinyl polymer part is less than 20 w/w %, it is difficult for the copolymer to cover uniformly the resin particle surface, accordingly, in the molding process of the expandable resin particles, the fluorintaed vinyl polymer part does not spread over the whole molded article, resulting to the insufficient effect of the invention.

The examples of the forms of the copolymer to be used in the invention composed of the fluorinated vinyl polymer part and the hydrophilic vinyl polymer part are showed in the following.

(I) Random copolymer

A copolymer obtained by radical copolymerization of a fluorinated vinyl monomer and a hydrophilic vinyl monomer using a conventional radical polymerization initiator.

(II) Block copolymer

A polymer having peroxy or azo bonds is obtained by polymerizing either a fluorinated vinyl monomer or a hydrophilic vinyl monomer using a polymeric peroxide or a polyazo compound as a polymerization initiator (the first step), and then by copolymerizing either a hydrophilic vinyl monomer or a fluorinated vinyl monomer which was not used in the first step, using the polymer having peroxy or azo bonds obtained in the first step as a polymerization initiator. The thus obtained block copolymer which is composed of a fluorinated vinyl polymer part and a hydrophilic polymer part.

(III) Graft copolymer

A polymer having peroxy bonds is obtained by radical copolymerization of either a fluorinated vinyl monomer or a hydrophilic vinyl monomer and a vinyl monomer having peroxy bonds using a conventional radical polymerization initiator (the first step). Then, using the thus obtained polymer having peroxy bonds as a polymerization initiator, either a hydrophilic vinyl monomer or a fluorinated vinyl monomer which was not used in the first step is copolymerized. The thus obtained graft copolymer which is composed of a fluorinated vinyl polymer part and a hydrophilic polymer part.

Although some of these copolymers have been known as a general adhering preventer or textile treatment agent (Japanese Patent Laid-Open Sho No. 55-104310 and U.S. Pat No. 3,995,085), such use as in the present invention has never been known.

Of these copolymers, the block or random copolymer having the polymer part of the above formula (a) and (e) is preferable. The more preferable examples are a block or random copolymer of 3/7 of perfluorooctyl-($-C_8F_{17}$)ethylacrylate and 2-hydroxyethylmethacrylate, the block or random copolymer of 3/6/1 of perfluorodecyl($-C_{10}F_{21}$)ethylacrylate, 2-hydroxyethylmethacrylate and acrylic acid, the block or random copolymer of 6/4 of perfluorooctyl($-C_8F_{17}$)ethylacrylate and 2-hydroxyethylmethacrylate, and the block or random polymer of 5/4.5/0.5 of perfluorooctyl($-C_8F_{17}$)ethylacrylate, 2-2-hydroxyethylmethacrylate and phosphoric acid ester of 2 -hydroxyethylmethacrylate.

The molecular weight range of these copolymers is preferred to be 3,000–300,000 of weight mean molecular weight, and most of which are used in the range of 10,000–50,000. The molecular weight less than 3,000 does not exhibit a sufficient oil repelling property, and that exceeding 300,000 results in high viscosity whereby the lowering of the film forming and surface impregnating property in the surface layer of the expandable thermoplastic resin particle is presumed.

These copolymers are usually solid at ordinary temperature, but, since they have polar groups, it is convenient to use them dissolved in an organic solvent such as ethanol, isopropyl alcohol, acetone, methylisobutyl ketone, methylethyl ketone and ethyacetate, or in a mixture of the organic solvent and water. The emulsion in water may also be used. These copolymers of fine powder may also be used, as well as the fused matter.

In the present invention, the above copolymer covers (or coats) or is included on the surface or in the surface layer of the expandable thermoplastic resin particle. The term "cover" means principally the form in which the copolymer adheres in layers on the sufface of the resin particle, and the term "included in the surface layer " means the form in which the copolymer exists in the particle surface under the state of including at least a part (usually hydrophilic part) of the copolymer chain in the particle. Naturally, the above both forms may be a mixing state. Sometimes the copolymer is, in the covering or including process, impregnated into the particle interior, and also in this case, at least the covering on the surface and/or the including in the surface layer by the copolymer make the resin particle usable.

There may be various concrete methods by which the copolymer of the invention covers or is included in the expandable thermoplastic resin particles. For example, by sufficiently mixing the resin particles with the above solution, suspension; or fused liquid of the copolymer in a drum blender or the like, the copolymer may cover with adhering on the resin particle surface. Further, in impregnating the resin particles with a blowing agent in autoclave, the copolymer may be added in the medium to include it in the surface layer of the resin particle.

In case the above copolymer for covering is used in a liquid state such as solution, dispersion, or fused liquid, the expandable thermoplastic resin particles becomes sticky, causing trouble of making hose conveying to a pre-expander difficult. Accordingly, in such case the combined use of a metal salt of higher fatty acid is recommended. The metal salt of higher fatty acid has also effects of helping to the prevention of coagulation in pre-expanding, mold release, and smoothness of the molded article. From this view point, therefore, the present invention provides also the expandable thermoplastic resin particles in which in expandable thermoplastic resin particles containing a hydrocarbon having the lower boiling point than the softening point of the resin particle, a copolymer, which is composed of a fluorinated vinyl polymer part and a hydrophilic vinyl polymer part, and a metal salt of higher fatty acid covers or are included in the surface or surface layer of the resin partcle. As such metal salts of higher fatty acid, there may be mentioned zinc, magnesium calcium or aluminum salt of stearic, lauric or myristic acid, of which zinc stearate is preferable. They may be used in the form of the mixutre with the copolymer or the form of covering of the copolymer.

On the other hand, in using the copolymer in powder state, it is recommended in view of the adhering property to cover the resin particles in advance with liquid polyethyleneglycol as a spreading agent and then to cover with the powder copolymer.

In the invention, the copolymer covers or is included in the surface or surface layer of the expandable thermoplastic resin particle preferablly in an amount of 0.005–0.2 w/w % relative to the particles, more preferablly 0.01–0.1 w/w % to the thermoplastic resin particle. In case the amount of the copolymer covering or being included is less than 0.005 w/w %, the effect of prevention of oil or water exudation is insufficient, and in case it exceeds 0.2 w/w %, excessive sufficiency and a tendency to retard fusing together of each foamed particle in molding result undesirablly, In the invention, in combined use of the copolymer and the metal salt of higher fatty acid, an amount of the metal salt of higher fatty acid is 0.05–0.2 w/w %, preferably 0.05–0.1 w.w %, to the thermoplastic resin particles.

The feature of the invention is that the foamed articles molded from the expandable thermoplastic resin particles of the invention prevent markedly oil and water exudation, and fusing together of the resin particles in molding is not retarded. Such effects are considered to be derived from that the arrangement of fluoroalkyl groups in the copolymer, particularly the uniform arrangement of head —$CF_2$ or —$CF_3$ on the surface of the expandable resin particle, causes the marked lowering of the surface energy, giving the water and oil repelling property. The reason for the effects of the copolymer by the hydrophilic vinyl monomer is unrestrictive, but the monomer is considered to contribute to the above object from that the head —$CF_2$ or —$CF_3$ is expected to orient outward uniformly because the side chain of the fluorinated polymer in the copolymer has a good non-aggregation property. And, the polar effect of the hydrophilic vinyl polymer part is considered to contribute to the affinity with the expandable thermoplastic resin such as polystyrene or to prevention of a hindrance of adherability between the thermoplastic resin particles.

Molded articles from the expandable thermoplastic resin particles of the invention including food vessels such as tablewares, cooking outfits and food containers, which pack directly oily and fatty foods such as tallow, vegetable oil such as bean oil and rape oil, lard, instant noodles, instant meals, stew, mayonnaise, dressing sauce, curry roux, butter, margarin, white sauce, yogurts, icecream, doughnut, hamburger, and fried chicken, retard oil, fat or color exudation outward from gaps between foamed particles for a long time, making possible an application field wherein they were unusable up to now, further being expected to expand the use.

Similarly, in the above mentioned drain-pan of the home air-conditioner, the reduction of the working process number is expected. Also, an elevation of the commercial value of a portable simplified ice-box or a fresh-fish box is expected.

In case substances to be used in the invention are practically used for food vessels, it is a matter of course that additions to be used should be the substances guaranteed safety on food hygiene and should be applied within the restricted range of the use amounts.

The following examples are illustrative of the present invention (thereafter parts refer to weight parts).

REFERENCE EXAMPLE 1

(Synthesis Example of Fluorinated Random Copolymer)

After introducing nitrogen gas into a four mouthed flask of 500 ml fitted a thermometer, a dropping funnel, a nitrogen gas inlet tube, and a stirrer, 175 g of ethanol was put into the flask and heated to 65° C. by the use of a water bath. Then, a mixture of 45 g of fluorinated acrylate represented with

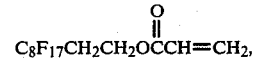

30 g of 2-hydroxyethyl methacrylate (HEMA), 2 g of butylperoxypivarate, and 50 g of ethanol was dropped for 1.5 hrs. then reacted for 3 hrs at 65° C.

The polymerization conversion of the thus obtained ethanol solution of the fluorinated random copolymer was 99.0% according to the measurement method (JIS K-5400) of the heating residue. It was confirmed that the obtained fluorinated random copolymer was composed of 60 w/w % of the fluorinated vinyl polymer part and 40 w/w % of the hydrophilic vinyl polymer part, and was about 50,000 of the weight mean molecular weight.

REFERENCE EXAMPLES 2-7

(Other Synthesis Examples of Fluorinated Random Copolymer)

By the use of the apparatus identical with Reference Example 1, using a solvent, a fluorinated vinyl monomer, and a hydrophilic vinyl monomer shown in Table 1, each synthesis was operated under the polymerization condition shown in Table 1 similarly with Reference Example 1. On each solution of the obtained fluorinated random copolymer the polymerization conversion, the proportion of each polymer part, and the weight mean molecular weight are shown in Table 1.

TABLE 1

| Reference example | Solvent | Fluorinated vinyl polymer | Charge (g) / Proportion (w/w %) | Hydrophilic vinyl polymer | Charge (g) / Proportion (w/w %) | Weight mean molecular weight | Temperature (°C.) | Time (hr) | Polymerization conversion (%) |
|---|---|---|---|---|---|---|---|---|---|
| 1 | Ethanol | F-1 | 45 / 60 | HEMA | 30 / 40 | 50000 | 65 | 3 | 99.0 |
| 2 | Ethanol | F-1 | 22.5 / 30 | HEMA | 52.5 / 70 | 30000 | 65 | 3 | 98.7 |
| 3 | Ethanol | F-3 | 48.75 / 65 | HEMA | 26.25 / 35 | 40000 | 65 | 3 | 99.0 |
| 4 | Methanol/water = 1/1 | F-3 | 37.5 / 50 | HMPT | 37.5 / 50 | 10000 | 65 | 5 | 98.8 |
| 5 | Methanol | F-2 | 37.5 / 50 | DMAEMA | 37.5 / 50 | 30000 | 65 | 5 | 98.5 |
| 6 | Ethanol | F-4 | 22.5 / 30 | HEMA/AA | 45/7.5 / 60/10 | 80000 | 65 | 3 | 99.0 |
| 7 | n-Butanol | F-1 | 37.5 / 50 | DMAAm | 37.5 / 50 | 30000 | 65 | 5 | 99.2 |

(Note):

F-1: $C_8F_{17}CH_2CH_2OCOCH=CH_2$.

F-2: $C_8F_{17}CH_2CH_2OCOC(CH_3)=CH_2$

F-3: $C_8F_{17}SO_2N(C_3H_7)CH_2CH_2OCOCH=CH_2$,

F-4: $C_{10}F_{21}CH_2CH_2OCOCH=CH_2$

HEMA: 2-hydroxyethylmethacrylate,
HMPT: 2-hydroxy-3-methacryloxypropyltrimethylammonium chloride,
DMAEMA: dimethylaminoethylmethacrylate,
AA: acrylic acid,
DMAAm: dimethylacrylamide

REFERENCE EXAMPLE 8

(Synthesis Example of Flourinated Block Copolymer)

Using the apparatus identical with Reference Example 1, after introducing nitrogen gas, 175 g of ethanol was put into the flask and heated to 70° C. Then, a mixture of 56.25 g of HEMA, 5.0 g of polydiacylperoxide (manufactured by NIPPON YUSHI Co.) represented with $$H \!-\!\!\left[ OC(CH_2)_4CO(CH_2CH_2O)_3C(CH_2)_4CO(CH_2CH_2O)_3 - C(CH_2)_4CO \right]_{\!n}\!\! H \quad (n = 2\text{-}20)$$

and 50 g of ethanol was dropped for 2 hrs, then reacted for 4 hrs at 70° C. Next, 18.75 g of fluorinated acrylate identical with that used in Reference Example 1 was dropped for 0.5 hr, then reacted for 5 hrs at 70° C. On the obtained solution of the fluorinated block copolymer, it was confirmed that the polymerization conversion was 99.9%, and the copolymer was composed of 25 w/w % of the fluorinated vinyl polymer part and 75 w/w % of the hydrophilic vinyl polymer part, and the weight mean molecular weight was about 70,000.

REFERENCE EXAMPLES 9-15

(Other Synthesis Examples of Fluorinated Block Copolymer)

By the use of the apparatus identical with Reference Example 1, using a fluorinated vinyl monomer and a hydrophilic vinyl monomer shown in Table 2, each synthesis was operated under the polymerization condition shown in Table 2 similarly with Reference Example 8. On each solution of the obtained fluorinated block copolymer, the polymerization conversion, the proportion of polymer part, and the weight mean molecular weight are shown in Table 3.

TABLE 2

| | Polymerization condition | | | | | |
|---|---|---|---|---|---|---|
| | Polymerization of the First Step | | | Polymerization of the Second Step | | |
| Reference Example | Hydrophilic vinyl monomer (g) | PPO (g) | Reaction time (hr) | Fluorinated vinyl monomer (g) | Reaction time (hr) | Polymerization conversion (%) |
| 8 | HEMA 56.25 | 5.0 | 4 | F-1 18.75 | 5 | 99.9 |
| 9 | $PE_{90}$ 30 | 4.0 | 4 | F-3 45 | 5 | 98.0 |
| 10 | PM 15 | 2.5 | 3 | F-3 60 | 5 | 98.5 |
| 11 | HEMA/PM 33.75/3.75 | 3.5 | 4 | F-1 37.5 | 5 | 99.2 |
| 12 | $PE_{350}$ 60 | 6.0 | 5 | F-2 15 | 5 | 97.6 |
| 13 | $PE_{90}$/AAm 26.25/26.25 | 6.0 | 5 | F-1 22.5 | 5 | 97.9 |
| 14 | HPMA/MMAAm 22.5/37.5 | 5.5 | 4 | F-2 15 | 5 | 98.5 |

TABLE 2-continued

| | Polymerization condition | | | | | |
|---|---|---|---|---|---|---|
| | Polymerization of the First Step | | | Polymerization of the Second Step | | |
| Reference Example | Hydrophilic vinyl monomer (g) | | PPO (g) | Reaction time (hr) | Fluorinated vinyl monomer (g) | Reaction time (hr) | Polymerization conversion (%) |
| 15 | HEMA | 18.75 | 3.0 | 3 | F-1  56.25 | 5 | 99.2 |

(Note):

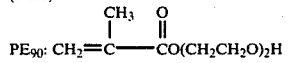

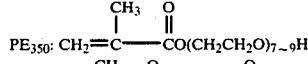

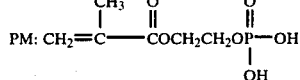

AAm: acrylamide
HPMA: 2-hydroxypropylmethacrylate
MMAAm: methoxymethylolacrylamide

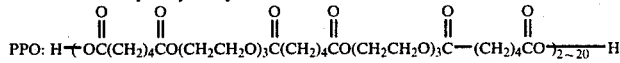

HEMA: F-1:F-2:F-3 show the substance identical with that in Table 1.

TABLE 3

| Reference Example | Fluorinated Block Copolymer | | | | |
|---|---|---|---|---|---|
| | Hydrophilic vinyl polymer | | Fluorinated vinyl polymer | | Weight mean molecular weight |
| 8 | HEMA | 75 (weight parts) | F-1 | 25 (weight parts) | 70000 |
| 9 | PE90 | 40 | F-3 | 60 | 100000 |
| 10 | PM | 20 | F-3 | 80 | 100000 |
| 11 | HEMA/PM | 45/5 | F-1 | 50 | 80000 |
| 12 | PE350 | 80 | F-2 | 20 | 50000 |
| 13 | PE90/AAm | 35/35 | F-1 | 30 | 30000 |
| 14 | HPMA/MMAAm | 30/50 | F-2 | 20 | 30000 |
| 15 | HEMA | 25 | F-1 | 75 | 20000 |

(Note):
The symbols in Table 3 shows the same substances as those in Table 2.

REFERENCE EXAMPLE 16

(Synthesis Example of Fluorinated Graft Copolymer)

Using the apparatus identical with Reference Example 1, after introducing nitrogen gas, 100 g of ethanol was put into the flask and heated to 65° C. Then, a mixture of 30 g of HEMA, 7.5 g of acrylic acid, 5 g of t-butylperoxyarylcarbonate, and 2 g of diisopropylperoxydicarbonate (IPP) was dropped for 1 hr, then reacted for 3 hrs at 55° C. Next, 37.5 g of fluorinated vinyl monomer (F-2) identical with that used in Reference Example 5 and 125 g of ethanol were dropped for 0.5 hr, then reacted for 5 hrs at 80° C. On the obtained solution of the fluorinated graft copolymer, it was confirmed that the polymerization conversion was 98.5%, and the copolymer was composed of 50 w/w % of the fluorinated vinyl polymer part and 50 w/w % of the hydrophilic vinyl polymer part, and the weight mean molecular weight was about 200,000.

REFERENCE EXAMPLES 17-19

(Other Synthesis Examples of Fluorinated Graft Copolymer)

By the use of the apparatus identical with Reference Example 1, using a fluorinated vinyl monomer and a hydrophilic vinyl monomer shown in Table 4, each synthesis was operated under the polymerization condition shown in Table 4 similarly with Reference Example 16. On each solution of the obtained fluorinated graft copolymer, the polymerization conversion, the proportion of polymer part, and the weight mean molecular weight are shown in Table 5.

TABLE 4

| | Polymerization condition | | | | | | |
|---|---|---|---|---|---|---|---|
| | Polymerization of the First Step | | | | Polymerization of the Second Step | | |
| Reference Example | Hydrophilic vinyl monomer (g) | | IPP (g) | Reaction time (hr) | Fluorinated vinyl monomer (g) | Reaction time (hr) | Polymerization Conversion (%) |
| 16 | HEMA/AA | 30/7.5 | 2 | 3 | F-2  37.5 | 5 | 98.5 |
| 17 | DMAAm/AA | 27/6.75 | 4 | 4 | F-1  41.25 | 6 | 98.5 |
| 18 | PM/AA | 18/11.25 | 3 | 3 | F-3  45.75 | 6 | 97.8 |
| 19 | DMAEMA/IA | 31.5/10.5 | 4 | 4 | F-2  33 | 5 | 97.5 |

(Note):
IS: itaconic acid, IPP: diisopropylperoxydicarbonate
The other symbols show the same substances as those in Table 2.

TABLE 5

| | Fluorinated Graft Copolymer | | | |
|---|---|---|---|---|
| | Hydrophilic Vinyl polymer | | Fluorinated vinyl polymer | Weight mean molecular weight |
| 16 | HEMA/AA | 40/10 | F-2  50 | 200000 |
| 17 | DMAAm/AA | 36/9 | F-1  55 | 150000 |
| 18 | PM/AA | 24/15 | F-3  61 | 100000 |
| 19 | DMAEMA/IA | 42/14 | F-2  44 | 150000 |

(Note)
The symbols in Table 5 show the same substances as those in Table 4.

EXAMPLE 1

To 1,000 g of expandable polystyrene resin particles of 0.3–0.6 mm in diameter containing 5.5 w/w % of n-pentane as a blowing agent, 0.6 g of the ethanol solution of the fluorinated random copolymer synthesized in Reference Example 1 and 1.5 g of zinc stearate were added. Then, they were stirred in a vessel whereby the copolymer covers the particles, obtaining the expandable polystyrene resin particles. The obtained particles were uniformly heated in atmospheric saturated steam of 90° C. for 5 min in a rotary stirring pre-expander to give the pre-expanded particles having bulk density of 100 g/l.

After aging with drying the pre-expanded particles for 6 hrs in the atmosphere, they were charged into a mold cavity of a cup shape of 500 cc in inner volume and 2 mm in thickness, then heated by steam of 1.8 Kg/cm²G for 5 sec (this is expressed as molding time in Table 6). After cooling, from the mold cavity the foamed molded prlystyrene resin article was obtained. A flavoring matter including curry being used for instant noodle was put into the above obtained cup by about 80% of the capacity, then the whole cup was wrapped with extended polypropylene resin film, and heated so as to be sealed by shrinkage of film, then allowed to stand in a oven at 60° C. Thus, whether the yellow color of curry exuded to the cup outside through the particles (fusing together surface) of the cup wall or not was observed (Test I). Even after 100 hrs, no exudation was observed, the cup being found to have no difficulty in practical use as a vessel for instant curry noodle. Also in allowing salad oil mixed with bean oil to stand in the cup, whether oil exuded to the cup outside through the foamed particles or not was observed (Test II). Even after 50 hrs, no exudation was observed.

Further, a colored solution, which was prepared by dissolving 2 g of sodium alkylbenzenesulfonate and by dispersing 1 g of eriochrom black T in 1 l of water, was put into the cup, and exudation to the outside wall was observed. Even after 1 hr, no exudation was confirmed.

EXAMPLES 2–19

Molding a cup identically with Example 1 was operated except that a fluorinated copolymer, a use amount of zinc stearate and a molding time were changed as shown in Table 6. Thereafter, the test identical with Example 1 was performed. The results of Test I [curry test) and Test II (salad oil test) are shown in Table 6. On exudation to the cup outside of aqueous solution of sodium alkylbenzenesulfonate and eriochrome black T, no exudation was confirmed in every case even after 1 hr.

TABLE 6

| Example | Fluorinated copolymer solution Type | Use Amount (g) | Use amount of Zinc stearate (g) | Molding time (sec) | Test I (hr) | Test II (hr) |
|---|---|---|---|---|---|---|
| 1 | Reference Example 1 | 0.6 | 1.5 | 5 | 100 or up | 50 or up |
| 2 | Reference Example 2 | 0.6 | 0 | 4 | " | " |
| 3 | Reference Example 3 | 0.6 | 1.5 | 4 | " | " |
| 4 | Reference Example 4 | 0.6 | 1.5 | 5 | 50 or up | 25 or up |
| 5 | Reference Example 5 | 1.2 | 0 | 5 | " | " |
| 6 | Reference Example 6 | 1.2 | 0 | 4 | " | " |
| 7 | Reference Example 7 | 1.2 | 1.5 | 4 | " | " |
| 8 | Reference Example 8 | 1.2 | 1.5 | 5 | " | " |
| 9 | Reference Example 9 | 0.6 | 1.5 | 5 | 100 or up | 50 or up |
| 10 | Reference Example 10 | 0.6 | 0 | 4 | " | " |
| 11 | Reference Example 11 | 0.6 | 0 | 4 | " | " |
| 12 | Reference Example 12 | 1.2 | 0 | 5 | 50 or up | " |
| 13 | Reference Example 13 | 1.2 | 1.5 | 5 | 50 or up | 25 or up |
| 14 | Reference Example 14 | 0.6 | 1.5 | 4 | 100 or up | 50 or up |
| 15 | Reference Example 15 | 0.6 | 1.5 | 4 | " | " |
| 16 | Reference Example 16 | 1.2 | 1.5 | 5 | 50 or up | " |
| 17 | Reference Example 17 | 1.2 | 1.5 | 5 | 100 or up | " |
| 18 | Reference Example 18 | 1.2 | 0 | 4 | " | " |
| 19 | Reference | 1.2 | 0 | 4 | " | " |

TABLE 6-continued

| | Fluorinated copolymer solution | | Use amount of | Molding | | |
|---|---|---|---|---|---|---|
| Example | Type | Use Amount (g) | Zinc stearate (g) | time (sec) | Test I (hr) | Test II (hr) |
| | Example 19 | | | | | |

(Note)
Test I: curry test, Test II: salad oil test

COMPARATIVE EXAMPLE 1

The surfaces of 1,000 g of the expandable polystyrene resin particles used in Example 1 were uniformly covered with 1.5 g of zinc stearate. On the cup obtained from these particles identically with Example I, a similar curry test was performed. After 30 min, yellow color already exuded to nearly all outside of the cup, the cup being found to be in no practical use.

Further, similarly with Example 1 a mixed salad oil test was performed. Within 30 min, exudation to the cup outside was remarkably observed.

In cutting the molded article, a cup, obtained by Comparative Example 1, each foamed particle in the cutted surface was wholly cut, the degree of fusing together being nearly 100% of the best one.

EXAMPLE 20

In impregnating polystyrene resin particles of 1.0–1.5 mm in diameter with 5.5 w/w % of butane as a blowing agent and 1.5 w/w % of cyclohexane as a blowing assistant, 8 g of 25% ethanol solution of the fluorinated block copolymer synthesized in Reference Example 9 was added to 1,000 g of the polystyrene resin. Then, the reaction solution was kept at 100° C. for 5 hrs in a closed vessel, and taken out after cooling to room temperature, then after washing and drying expandable polystyrene resin particles were obtained. Further, to the particles 1.0 g of zinc stearate was added, and they were stirred in a vessel so that zinc stearate covers the particles, obtaining the above mentioned expandable polystyrene resin particles.

Identically with Example 1, the said composition was pre-expanded to bulk density of 40 g/1 to give the pre-expanded particles. After aging and drying the pre-expanded particles by standing for 12 hrs in the atmosphere, they were charged into a mold of box type of 10 mm in thickness, then heated by steam of 0.7 Kg/cm$_2$G for 25 sec. After cooling, taken out from the mold a foamed molded polystyrene resin article was obtained. A colored solution which was prepared by dissolving 2 g of sodium alkylbenzeneslufonate and dispersing 1 g of eriochrom black T was put into the above obtained box type molded article, and exudation to the outside wall was observed. Even after 24 hrs, no exudation was observed, the said molded article being confirmed to have nearly no water exudation for a long period.

COMPARATIVE EXAMPLE 2

Without the addition of the fluorinated copolymer, Example 20 was repeated; 1,000 g of the same expandable polystyrene resin particles was uniformly covered with 1.0 g of zinc stearate, then similarly a leak test of colored solution was performed. After 5 min, exudation of the colored solution was observed on the whole outside of the molded box type article.

EXAMPLE 21

The surface of 1,000 g of AS resin (25 w/w % of acrylonitrile-styrene copolymer) containing 5.0 w/w % of n-pentane as a blowing agent was uniformly covered with 2 g of the 25% n-butanol solution of the fluorinated random copolymer synthesized in Reference Example 7 to obtain an expandable AS resin particle composition.

The obtained particles were uniformly heated in atmospheric saturated steam of 90° C. for 5 min in a rotary stirring pre-expander to give the pre-expanded particles having bulk density of 20 g/1. After aging and drying the pre-expanded particles for 12 hrs in the atmosphere, they were charged into a mold of box type of 20 mm in thickness, then heated by steam of 0.9 Kg/cm$^2$G for 40 sec. After cooling with water, taken out from the mold a foamed AS resin molded article was obtained.

A colored solution which was prepared by dissolving 2 g of sodium alkylbenzenesulfonate and dispersing 1 g of eriochrom black T was put into the above obtained box type molded article, and exudation to the outside wall was observed. Even after 24 hrs, no exudation was observed, the said molded article being confirmed to have nearly no water exudation for a long period.

COMPARATIVE EXAMPLE 3

Without the addition of the fluorinated copolymer, Example 21 was repeated, and on the obtained box type molded article, similarly a exudation test of colored solution was performed. After 15 min, exudation of the colored solution was observed on the outside wall of the molded article.

EXAMPLE 22

Polyethylene resin ("Yukalon EC-60A", a trade name, manufactured by Mitsubishi Petrochemical Co. Ltd.) was dispersed in an aqueous medium, and the solution which was prepared by dissolving dicumylperoxide as a crosslinking agent and benzoylperoxide and t-butylperbenzoate as polymerization catalysts in styrene monomer [corresponding to 67 w/w % to the above polyethylene resin) was slowly dropped into the above aqueous medium so as to be absorbed in the polyethylene resin particles in order to cause polymerization. Then n-butane was pressed in to impregnate the resin particles, and after cooling the particles were taken out to obtain expandable polyethylene resin particles containing 9.0 w/w % of n-butane.

To 1,000 g of the obtained expandable polyethylene resin particles, 2 g of 25% ethanol solution of the fluorinated block copolymer synthesized in Reference Example 9 was added, and the mixture was stirred in a vessel so that the copolymer covered the surface of the particle to obtain the composition.

The obtained particles were heated by steam of 0.4 Kg/cm$^2$G for 1.5 min by the use of a rotary stirring pre-expander to give the pre-expanded particles having bulk density of 40 g/1. After allowing the pre-expanded particles to stand for 6 hrs at room temperature, they were charged into a mold of box type of 25 mm in thickness, then heated by steam of 0.6 Kg/cm$^2$G for 1.3 min. After cooling, taken out from the mold a molded article was obtained.

A colored solution used in Example 1 was put into the above obtained molded article, and exudation to the outside wall was observed. Even after 24 hrs, nearly no exudation was observed, the said molded article being confirmed to have nearly no water exudation for a long period.

COMPARATIVE EXAMPLE 4

Without the addition of the fluorinated copolymer, Example 22 was repeated, and on the obtained box type molded article, similarly a exudation test of colored solution was performed. After 30 min, exudation of the colored solution was observed on the outside wall of the molded article.

What we claim is:

1. Expandable thermoplastic resin particles comprising a thermoplastic resin and a hydrocarbon having the lower boiling point than the softening point of the thermoplastic resin in which a copolymer composed of a fluorinated vinyl polymer part and a hydrophilic vinyl polymer part covers or is included on the surface or in the surface layer of the expandable thermoplastic particle wherein said copolymer of 20–80 w/w % of a flourinated vinyl polymer part and 80–20 w/w % of a hydrophilic vinyl polymer part.

2. The resin particles of claim 1 in which the copolymer is used in an amount of 0.005–0.2 w/w % to the expandable thermoplastic resin particles.

3. The resin particles of claim 1 in which the fluorinated vinyl polymer part of the copolymer is composed of one or more types of fluorinated vinyl monomer selected from the following group;

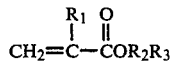

(a) a compound of the formula:
wherein $R_1$ is hydrogen, fluorine, $-CH_3$, $-CHF_2$, $-CH_2F$, $-CF_3$, $-OCOCH_2F$, $-OCOCHF_2$, or $-C_nF_{2n+1}$ (n is an integer of 1–10), $R_2$ is $-C_mH_{2m}$ (m is an integer of 1–12) or $-CH_2CH_2O-$, $R_3$ is $-C_qF_{2q+1}$ (q is an integer of 1–6), $-(CF_2)_nOR_5$ ($R_5$ is $-C_aH_{2a}C_bF_{2b+1}$ or $-C_aH_{2a}C_bF_{2b}H$, (a is an integer of 0–10, b is an integer of 0–16, and n is the same as above), $-(CF_2)_qH$ (q is the same as above),

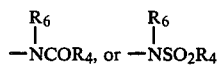

($R_4$ is $-C_qF_{2q+1}$, $R_6$ is $-C_nH_{2n+1}$, q and n are the same as above), (b) a compound of the formula:

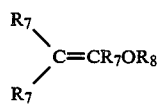

wherein $R_7$ is hydrogen or fluorine, $R_8$ is $-C_aH_{2a}C_bB_{2b+1}$ (a and b are the same as above) or $-CF_2CHFCl$, (c) a compound of the formula:

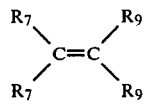

wherein $R_7$ is the same as above, $R_9$ is hydrogen, fluorine or chlorine; and at least one of $R_7$ and $R_9$ is fluorine, and (d) a compound of the formula:

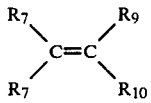

wherein $R_7$ and $R_9$ are the same as above, $R_{10}$ is $-C_aH_{2a}C_bF_{2b+1}$ (a and b are the same as above).

4. The resin particles of claim 1 in which the hydrophilic vinyl polymer part of the copymer is composed of one or more types of hydrophilic vinyl monomer selected from the following (e) a compound of the formula:

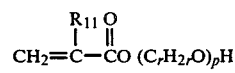

wherein $R_{11}$ is hydrogen or $-CH_3$, r is an integer of 1–4, p is an integer of 1–20, (f) a compound of the formula:

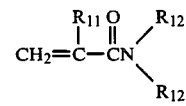

wherein $R_{11}$ is the same as above, $R_{12}$ is hydrogen, $-C_rH_{2r+1}$ (r is the same as above), $-CH_2OCH_3$, $-C(CH_3)_2CH_2COCH_3$,

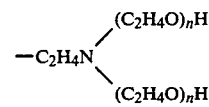

(n is the same as above), $-C_rH_{2r}CONH_2$ (r is the same as above), $-C_2H_4CONH_2$, $-C_2H_4N(CH_3)_2$, $-(CH_2)_3N(CH_3)_2$, $-COOC_rH_{2r+1}$ (r is the same as above), or $-C_xH_{2x}SO_3H$ (x is an integer of 2–4), (g) a compound of the formula:

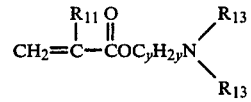

wherein $R_{11}$ is the same as above, y is an integer of 2 or 3, $R_{13}$ is $-C_zH_{2z+1}$ (z is an integer of 1–8), (h) a compound of the formula:

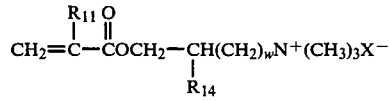

wherein $R_{11}$ is the same as above, $R_{14}$ is hydrogen or hydroxy, w is 0 or 1, X is chlorine, bromine, iodine or carboxyl, (i) a compound of the formula:

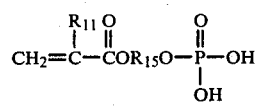

wherein $R_{11}$ is the same as above, $R_{15}$ is $-C_yH_{2y}-$ (y is the same as above)

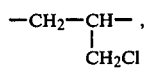

(j) a compound of the formula:

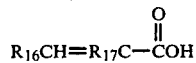

wherein $R_{16}$ is hydrogen, $-CH_3$, or $-COOH$, $R_{17}$ is hydrogen, $-CH_3$, or $-CH_2COOH$, and (k) N-vinylpyrrolidone.

5. The resin particles of claim 3 or claim 4 in which the copolymer is a block, graft, or random copolymer.

6. The resin particles of claim 1 in which the thermoplastic resin particles are styrene resin particles.

7. The resin particles of claim 6 in which the styrene resin is a styrene polymer, methystyrene polymer, styreneacrylonitrile copolymer, or styrene-(metha)acrylic acid ester copolymer.

8. The resin particles of claim 1 in which the copolymer further contains a metal salt of higher fatty acid or is coated by the metal salt of higher fatty acid.

9. The resin particles of claim 8 in which the metal salt of higher fatty acid is zinc stearate.

10. The resin particles of claim 8 in which the metal salt of higher fatty acid is used in an amount of 0.05–0.2 w/w % to the expandable thermoplastic resin particles.

* * * * *